(12) United States Patent
Vikram et al.

(10) Patent No.: US 10,977,718 B2
(45) Date of Patent: Apr. 13, 2021

(54) METHOD AND DEVICE FOR PROCESSING USER INTERACTION BASED TRANSACTIONS

(71) Applicant: Wipro Limited, Bangalore (IN)

(72) Inventors: Amit Vikram, Bangalore (IN); Krunal Ajit Kapadia, Surat (IN)

(73) Assignee: Wipro Limited, Bangalore (IN)

( * ) Notice: Subject to any disclaimer, the term of this patent is extended or adjusted under 35 U.S.C. 154(b) by 747 days.

(21) Appl. No.: 15/459,216

(22) Filed: Mar. 15, 2017

(65) Prior Publication Data

US 2018/0218443 A1 Aug. 2, 2018

(30) Foreign Application Priority Data

Jan. 31, 2017 (IN) .............................. 201741003652

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0641* (2013.01); *G06Q 10/087* (2013.01); *G06Q 30/0633* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 6,336,105 B1* | 1/2002 | Conklin | ................. | G06Q 30/06 705/26.3 |
| 7,069,234 B1* | 6/2006 | Cornelius | .............. | G06Q 20/10 705/26.35 |
| 7,577,582 B1* | 8/2009 | Ojha | ...................... | G06Q 30/06 705/26.3 |
| 8,140,405 B2* | 3/2012 | Mesaros | ................ | G06Q 30/02 705/26.2 |
| 8,249,942 B2* | 8/2012 | Mesaros | ................ | G06Q 30/02 705/26.2 |
| 8,279,079 B2 | 10/2012 | Bergman et al. | | |

(Continued)

OTHER PUBLICATIONS

Weigand, Michael, "Webinar Recap: Measuring Intent With Google Analytics", portent.com, Dated Sep. 25, 2014. (Year: 2014).*

*Primary Examiner* — Mark A Fadok
(74) *Attorney, Agent, or Firm* — Finnegan, Henderson, Farabow, Garrett & Dunner, LLP

(57) ABSTRACT

A method and device for processing a transaction based on user interaction is disclosed. The method includes providing a plurality of article icons associated with a plurality of articles. At least one icon attribute of the plurality of article icons is indicative of real-time quantity associated with the plurality of articles. The method further includes receiving a first user interaction with an article icon and, in response, displaying at least one order icon representing at least one supplier for the article. The method includes receiving a second user interaction with an order icon and, in response, establishing a communication channel between the user and a supplier associated with the order icon in response to the second user interaction with the order icon. The communication channel enables at least one of the user and the supplier to dynamically modify at least one article attribute related to the article.

14 Claims, 11 Drawing Sheets

(56) References Cited

U.S. PATENT DOCUMENTS

| | | | | |
|---|---|---|---|---|
| 8,706,564 B2* | 4/2014 | Mesaros | ................ | G06Q 30/02 |
| | | | | 705/26.2 |
| 9,626,716 B1* | 4/2017 | Gaw | ................... | G06Q 30/0601 |
| 2002/0152137 A1* | 10/2002 | Lindquist | ............... | G06Q 30/06 |
| | | | | 705/26.8 |
| 2005/0071242 A1* | 3/2005 | Allen | ................... | G06Q 10/087 |
| | | | | 705/26.5 |
| 2011/0213649 A1* | 9/2011 | Mesaros | ................ | G06Q 30/02 |
| | | | | 705/14.23 |
| 2013/0268422 A1* | 10/2013 | Ram | ................. | G06Q 30/0222 |
| | | | | 705/37 |
| 2014/0006218 A1* | 1/2014 | Muthu | ............... | G06Q 30/0601 |
| | | | | 705/26.82 |
| 2014/0083058 A1 | 3/2014 | Issing et al. | | |
| 2014/0129410 A1 | 5/2014 | Buck | | |
| 2014/0129951 A1 | 5/2014 | Amin et al. | | |
| 2014/0279294 A1 | 9/2014 | Field-Darragh et al. | | |
| 2015/0019352 A1* | 1/2015 | Flynn | ................... | G06F 16/972 |
| | | | | 705/14.73 |
| 2017/0278177 A1* | 9/2017 | Lim | ................... | G06Q 30/0641 |

* cited by examiner

US 10,977,718 B2

METHOD AND DEVICE FOR PROCESSING USER INTERACTION BASED TRANSACTIONS

TECHNICAL FIELD

The present invention relates to online transactions, in particular, to method and device for processing user interaction based transactions.

BACKGROUND

Most small stores, such as mom and pop stores, stock small quantities of multiple products that are of different brands and package sizes. These stores order products from multiple suppliers or distributors, who may be located at varying distances from these stores and may offer competing product offers or promotions. Owing to small customer base that is limited to nearby locales, these small stores do not stock products in abundance in order to avoid damage or expiry of products because of insufficient and archaic storage means. At the same time, lack of availability of one or more products at these stores has an adverse impact on retention of loyal customer base.

Conventionally, these stores are heavily dependent on sales person of these suppliers or distributors to replenish their inventory and to inform these stores about promotional offers provided by the suppliers or distributors. However, due to inadvertent human error, the sales person may at times forget to inform these store owners regarding the promotional offers or the store owners themselves may forget to avail such offers in time.

There is therefore a need for a method and device to efficiently manage product inventory for such small stores.

SUMMARY

In one embodiment, a method for processing a transaction based on user interaction is disclosed. The method includes providing, on a computing device, a plurality of article icons associated with a plurality of articles, wherein at least one icon attribute of the plurality of article icons is indicative of real-time quantity associated with the plurality of articles; receiving, by the computing device, a first user interaction with an article icon from the plurality of article icons associated with an article from the plurality of articles; displaying, on the computing device, in response to receiving the first user interaction with the article icon, at least one order icon representing at least one supplier for the article; receiving, by the computing device, a second user interaction with an order icon from the at least one order icon; and establishing, by the computing device, a communication channel between the user and a supplier associated with the order icon in response to the second user interaction with the order icon, wherein the communication channel enables at least one of the user and the supplier to dynamically modify at least one article attribute related to the article.

In another embodiment, a computing device for processing a transaction based on user interaction is disclosed. The computing device includes a processor and a memory communicatively coupled to the processor, wherein the memory stores processor instructions, which, on execution, causes the processor to: provide a plurality of article icons associated with a plurality of articles, wherein at least one icon attribute of the plurality of article icons is indicative of real-time quantity associated with the plurality of articles; receive a first user interaction with an article icon from the plurality of article icons associated with an article from the plurality of articles; display in response to receiving the first user interaction with the article icon, at least one order icon representing at least one supplier for the article; receive a second user interaction with an order icon from the at least one order icon; and establish a communication channel between the user and a supplier associated with the order icon in response to the second user interaction with the order icon, wherein the communication channel enables at least one of the user and the supplier to dynamically modify at least one article attribute related to the article.

In yet another embodiment, a non-transitory computer-readable storage medium having stored thereon, a set of computer-executable instructions is disclosed. The set of computer-executable instructions cause a computer comprising one or more processors to perform steps comprising: providing, on a computing device, a plurality of article icons associated with a plurality of articles, wherein at least one icon attribute of the plurality of article icons is indicative of real-time quantity associated with the plurality of articles; receiving, by the computing device, a first user interaction with an article icon from the plurality of article icons associated with an article from the plurality of articles; displaying, on the computing device, in response to receiving the first user interaction with the article icon, at least one order icon representing at least one supplier for the article; receiving, by the computing device, a second user interaction with an order icon from the at least one order icon; and establishing, by the computing device, a communication channel between the user and a supplier associated with the order icon in response to the second user interaction with the order icon, wherein the communication channel enables at least one of the user and the supplier to dynamically modify at least one article attribute related to the article.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
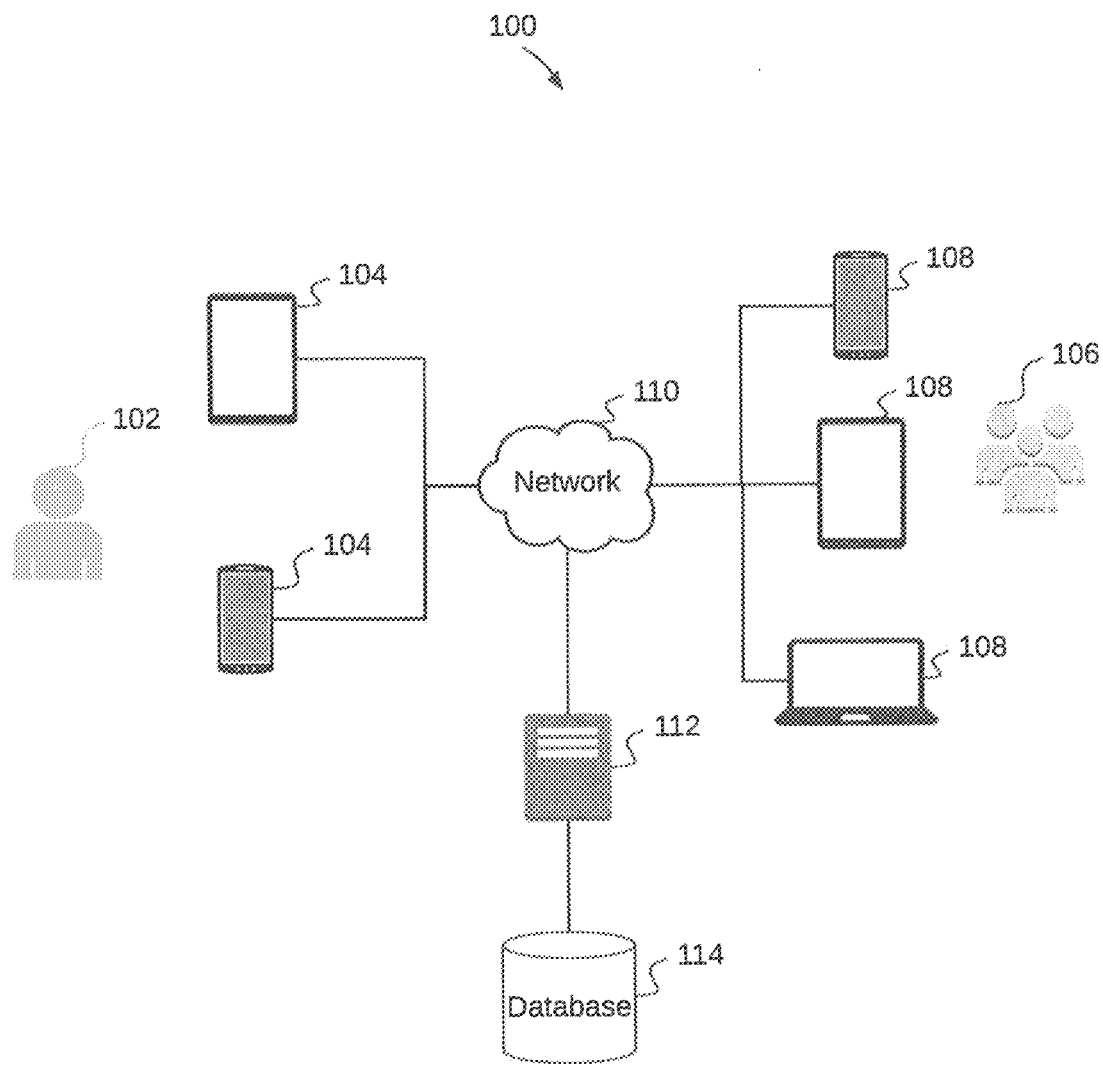
FIG. 1 illustrates an exemplary environment in which various embodiments may be employed.

Referring to FIG. 1, an environment 100 in which various embodiments may be employed, is illustrated. Environment 100 includes a user 102 that has access to a plurality of computing devices 104. In an embodiment, each computing device 104 may include a touch screen through which it can be operated by user 102. User 102 may be a store owner that accesses plurality of computing devices 104 to keep a record of the current store inventory. Alternatively, user 102 may be a procurement executive, responsible for procuring articles, for example, spare parts or construction material, from a manufacturer or a dealer. Examples of plurality of computing devices 104 may include, but are not limited to a laptop, a smart phone, an augmented reality device, a tablet, a phablet, and any Point of Sale (POS) device that has an inbuilt touch screen. In case of a legacy POS device (not show in FIG. 1) that does not have an inbuilt touch screen, plurality of computing devices 104 may be communicatively coupled to the legacy POS device in order to extract current inventory related information.

User 102 may use plurality of computing devices 104 to communicate with a plurality of suppliers 106 who have access to one or more of a plurality of computing devices 108. Plurality of supplier 106, for example, may be wholesale dealers, vendors, distributors, manufacturers, or brokers. Examples of plurality of computing devices 108 may include, but are not limited to a laptop, a smart phone, a tablet, a phablet, a laptop, and a desktop. The communication between one or more of plurality of computing devices 104 and one or more of plurality of computing devices 108 is enabled by a network 110, which may be a wired or a wireless network. Examples of network 108 may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

The communication between plurality of computing device 104 and 108 may be routed through a server 112 that is connected to network 110. Server 112 may have access to a database 114 that maintains a record of details associated with user 102 and plurality of supplier 106. These details, for example, may include, but are not limited to supplier ratings (on-time delivery, genuine products etc.), user ratings (satisfaction index etc.), location, reviews (user comments based on overall journey experience with supplier), and associated industry or field (personal care, durables, electronics etc.). When a communication request for supplies is initiated by user 102 through one or more of plurality of computing devices 104, server 112, based on data stored in database 114, may select most relevant suppliers from plurality of suppliers 106 that best suit user 102's requirements. Alternatively, server 112 may provide plurality of computing devices 104 access to database 114. In an embodiment, each of plurality of computing devices 104 may store a copy of database 114 in its local memory.

Figure 2:
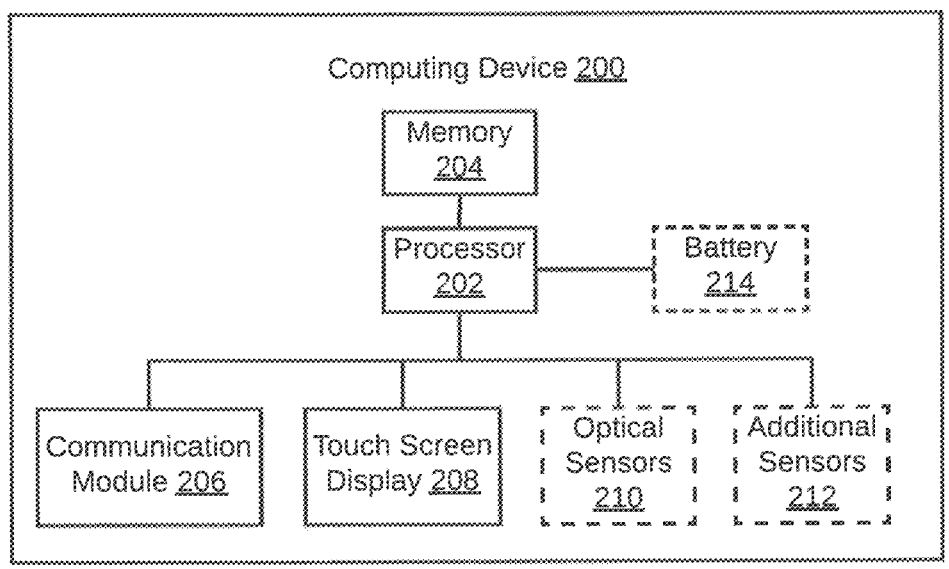
FIG. 2 illustrates a block diagram of a computing device for processing a transaction based on user interaction, in accordance with an embodiment.

Referring now to FIG. 2, a block diagram of a computing device 200 for processing a transaction based on user interaction is illustrated, in accordance with an embodiment. Computing device 200 includes a processor 202 that is coupled to a memory 204. Memory 204 stores instructions for processor 202, which, on execution, causes processor 202 to perform desired operations. Memory 204 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Various module and engines in memory 204 are further explained in detail in conjunction with FIG. 3.

To enable user of computing device 200 to communicate with plurality of communication devices 108, server 112 or any other external device, computing device 200 includes a communication module 206 (coupled to processor 202). Communication module 206 may support multiple communication protocols. Examples of these communication protocols may include, but are not limited to WLAN, Wi-Fi, LTE, WiMAX, GPRS, Bluetooth, Zigbee, Infrared, Near-Bytes, and NFC.

User 102 may interact with computing device 200 via a touch screen display 208, which is also coupled to processor 202. Touch screen display 208, for example, may be a Plasma display, a Liquid Crystal Display (LCD), a Light Emitting Diode (LED) display, an Organic Light Emitting Diode (OLED) display, and an Active Matrix OLED (AMOLED) display. Touch screen display 208 is configured to detect different tactile gestures made by user 102 on it. In addition to receiving inputs from user 102, touch screen display 208 also displays a plurality of article icons that are associated with a plurality of articles that user 102 may be interested in. Also, based on user 102's interaction with an article icon, touch screen display 208 displays one or more order icons that represent one or more suppliers for the article represented by the article icon.

Computing device 200 may also include optical sensors 210 that may be used to capture user's facial expressions, eye gaze, pupil size, and hand gestures made in the air. Optical sensors 210, for example, may include, but are not limited to a depth camera, an infrared light camera, a visible light camera, a position tracking camera, and an eye-tracking sensor. The information thus captured by optical sensors 210 may be shared with processor 202.

In addition to capturing user's facial expression and gestures, user 102's overall interaction with computing device 200 may also be captured through additional sensors 212 coupled to processor 202. Examples of additional sensors 212 may include, but are not limited to a 3D inclinometer sensor, accelerometer, gyroscope, pressure sensor, heat sensor, ambient light sensor, a compass, variometer, a tactile sensor, and a Global Positioning System (GPS) sensor. By way of an example, a gyroscope and/or an accelerometer may be used to detect movement of computing device 200. When computing device 200 is a portable device (for example, a tablet, a smart phone, or a phablet), it may also include a battery 214.

Figure 3:
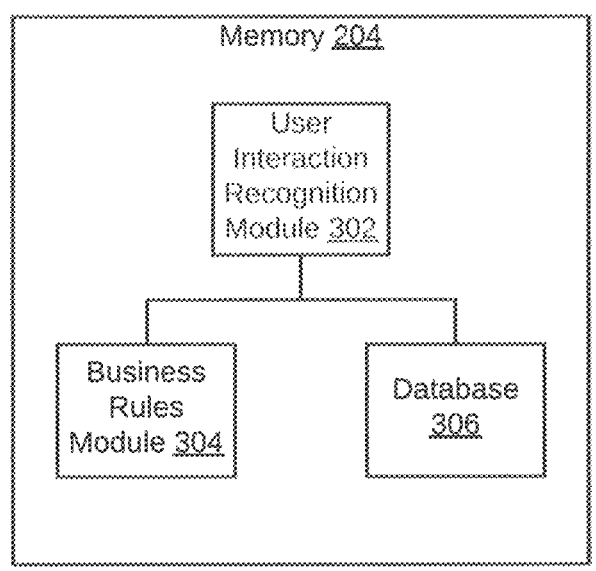
FIG. 3 illustrates a block diagram of various components within a memory of the computing device that processes a transaction based on user interaction, in accordance with an embodiment.

Referring now to FIG. 3, a block diagram of various components within memory 204 of computing device 200 that processes a transaction based on user interaction is illustrated, in accordance with an embodiment. Memory 204 includes a user interaction recognition module 302, a business rules module 304, and a database 306.

User interaction recognition module 302, based on adaptive and intelligent algorithms detects different types of user interactions that user 102 makes while interacting with computing device 200. Examples of these user interactions on touch screen display 208 may include, but are not limited to swipe in a particular direction, icon press for a predefined duration, making a pattern on touch screen display 208, or dragging an icon out from an extremity of touch screen display 208. Based on these interaction, user interaction recognition module 302 may identify the point of contact on touch screen display 208 and the duration of the contact.

Examples of other user interactions that may be captured by optical sensors 210 may include, but are not limited to hand gestures in the air (for example, a thumbs up, pinching movement, finger snap, multi-finger pattern), fast blinking of eyes, and certain eye movements. Examples of yet other user interactions may include, pressing predefined keys on a physical or virtual keypad and predefined movements of computing device 200 (for example, shaking or tilting computing device 200 in a predefined direction).

User interactions are mapped to business rules and stored in business rules module 304, such that, each user interaction either specifies a unique intention of user 102 or a unique action that should be performed by computing device 200 in response to that user interaction. These mappings are preconfigured in business rules module 304 and may be updated by an administrator via a system update. This is further explained in detail in conjunction with FIGS. 4, 5, and 6A-6E. Database 306 in memory 204 may be a local copy of database 114 and is regularly synched with it after predefined time intervals. Alternatively, database 306 may be independent of database 114 and may store information that includes, but is not limited to current inventory stock at user 102's premises, preferred stock suppliers (i.e., distributors or vendors), location of stock suppliers, current prices and miscellaneous costs, and past sales data. In an embodiment, computing device 200 may sync database 306 with database 114, in order to make the locally stored information in database 114 available to server 112.

Figure 4:
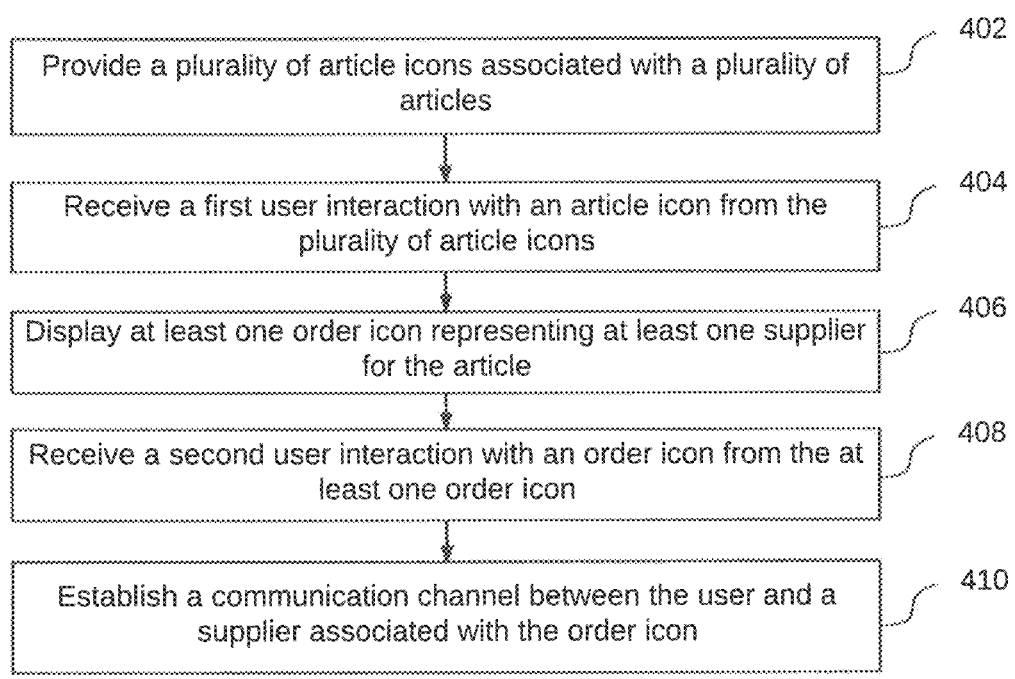
FIG. 4 illustrates a flowchart of a method for processing a transaction based on user interaction, in accordance with an embodiment.

Referring now to FIG. 4, a flowchart of a method for processing a transaction for procuring an article based on user interaction is illustrated, in accordance with an embodiment. The articles, for example, may include, but are not limited to groceries, spare parts, construction material, raw material, or medicines. The user may own the store, factory, or any other setup that requires these articles. In order to take stock of the current inventory of articles, the user may open an application on computing device 200. In response to this, at 402, a plurality of article icons may be displayed or provided on touch screen display 208, such that, each article icon represents an article in the user's inventory. Each of the plurality of article icons have one or more icon attributes associated with it. These icon attributes indicate real-time quantity of the plurality of articles. In an embodiment, one or more article icons may be automatically displayed without user request, when quantity of one or more associated articles is running below a predefined threshold level. The predefined threshold level may be defined and customized by user 102. This is illustrated in conjunction with FIG. 6A.

An article attribute may include, but is not limited to size of the article icon, a shape of the article icon, a color of the article icon, an orientation of the article icon, a position of the article icon on a display of the computing device, or a motion associated with the article icon. By way of an example, red color of an article icon may indicate that the article associated with the article icon is running low in the inventory. The number of units of the article that are left in the inventory may also be indicated in the article icon. By way of another example, the size of the article icon may indicate the quantity of the associated article. Smaller the size of the article icon, lesser would be the current quantity of that article. By way of yet another example, if a particular article is running low on quantity in the inventory, its associated article icon may be displayed as shaking. More vigorous is the shaking of an article icon, lesser would be the quantity of the article associated with the article icon. It will be apparent to a person skilled in the art that the invention is not limited to the above listed examples and any rendition of the above mentioned article attributes is within the scope of the invention.

Once the plurality of article icons have been displayed to the user via touch screen display 208, a first user interaction with an article icon from the plurality of article icons is received on touch screen display 208, at 404. Examples of these user interactions on touch screen display 208 may include, but are not limited to swiping the article icon in a particular direction, touching/pressing the article icon for a predefined duration, making a pattern on touch screen display 208, or dragging the article icon out of an extremity of touch screen display 208. This is further illustrated in detail in conjunction with FIG. 6A. Alternatively, the first user interaction may be received by one or more of optical sensors 210 or additional sensors 212. In this case, the first user interaction with the article Icon may include, but is not limited to hand gestures in the air (for example, a thumbs up, pinching movement, finger snap), fast blinking of eyes, certain eye movements, pressing predefined keys on a physical or virtual keypad, and predefined movements of computing device 200 (for example, shaking or tilting computing device 200 in a predefined direction).

In response to receiving the first user interaction with the article icon, one or more order icons are displayed on touch screen display 208, at 406. Each order icon represents a supplier for the article. The one or more order icons may be arranged substantially around the article icon on touch screen display 208 in an order of priority. The priority associated with an order icon may be determined based on order history of the user in relation to the supplier, user ratings associated with the supplier, and current location of the user with reference to a location of the supplier. By way of an example, when the user touches the article icon for a predefined duration (for example, two seconds), three order icons may be displayed substantially around the article icon in the form of a circle. These three order icons that represent three different suppliers for the article, may be arranged based on location the supplier with reference to the current location of the user. The order icon for the nearest supplier may be displayed closest to the article icon, while the order icon for the farthest supplier may be displayed farthest from the article icon. By way of another example, the order icons may be displayed as a list, such that the most relevant order icon is displayed at the top. This is illustrated in detail in conjunction with FIG. 6A.

Contemporaneous with display of the one or more order icons, one or more order details related to the article are also displayed. An order detail associated with an order icon includes one or more article attributes and is displayed relative to the order icon. An article attribute, for example, may include, but is not limited to stock availability of the article with the supplier represented by the order icon, promotional information offered by the supplier, price of the article quoted by the supplier, and time duration required by the supplier to deliver the article to the user. By way of an example, an order detail may be displayed within an associated order icon. By way of another example, an order detail may be displayed adjacent to an associated order icon. This is illustrated in conjunction with FIG. 6A.

Based on a review of order details displayed for each of the one or more order icons on touch screen display 208, the user may decide to place an order with one of the supplier. To this end, a third user interaction with respect to one of the one or more order icons is received on touch screen display 208. Various types of third user interaction that may be received are similar to that for the first user interaction. By way of an example, the user 102 may drag and drop the article icon on the order icon of the supplier with which the user had decided to create an order based on the listed order details. This is illustrated in detail in conjunction with FIG. 6B. Alternatively, the user may drag the order icon in a diagonally upwards direction on touch screen display 208 to create the order with the supplier associated with the order icon. This is illustrated in detail in conjunction with FIG. 6C. In response to receiving the third user interaction, an order for the article is created with the supplier, who is represented by the order icon. While creating the order, the user may also specify the quantity of the article for which the order is created. The finalized order details are then shared with the supplier on his/her computing device 108.

The user 102, however, may decide to modify one or more order details associated with an order icon, before creating an order. In this case, the user may perform a second user interaction with the order icon. Various types of second user interaction that may be received are similar to that for the first and third user interaction. At 408, the second user interaction is received by touch screen display 208. By way of an example, the second user interaction may be dragging the order icon in a diagonally downwards direction on touch screen display 208. This is illustrated in conjunction with FIG. 6C. In response to the second user interaction with the order icon, computing device 200 establishes a communication channel between the user and the supplier associated with the order icon at 410. The communication channel enables one or more of the user and the supplier to dynamically modify one or more article attributes related to the article. The communication channel may support an internal communication channel between the user and the supplier. Alternatively, the communication channel may be supported by an external communication application, for example, WhatsApp or any other messenger that is compatible with communication devices of both the user and the supplier.

Once the communication channel is established, one of the user or the supplier may initiate a negotiation interaction using one or more negotiation elements presented on touch screen display 208 via the communication channel. Various types of negotiation interactions that may be received are similar to that for the first, second, and third user interaction. A negotiation element may represent an article attribute of the article. The negotiation interaction with one or more negotiation elements applies one or more modification to one or more article attributes represented by the one or more negotiation elements. The user would thus be able to negotiate on one or more article attributes before creating and placing an order. By way of an example, user may press a negotiation element for a predefined duration of time to initiate negotiation with the supplier. The negotiation element may be associated with cost per unit for the article quoted by the supplier, and a long press for the predefined duration on the negotiation element may indicate that the user wants to modify or reduce the same. This is illustrated in detail in conjunction with FIGS. 6D and 6E.

Once the one or more modifications are received and presented on communication device of the user and/or the supplier, one or more of these modification may be approved by the user or the supplier, who received these modifications. Thus, based on user interactions made over the communication channel, whole or a part of the one or more article attributes are modified. It will be apparent to a person skilled in the art that the negotiation process may be iterative and may not end till both the user and the supplier reach an agreement on finalizing each article attribute. Once the one or more of these modification have been approved, final negotiated terms that include finalized article attributes is presented to both the user and the supplier. Based on the final negotiated terms, the user may intend to place an order with the supplier and may accordingly perform an order interaction to place the order. Various types of order interactions that may be received are similar to that for the first, second, and third user interaction. By way of an example, once the modification made to one or more article attributes have been approved and presented on touch screen display 208, a User Interface (UI) button reading: "Place the Order," may be presented to the user. User may press the UI element for a predefined time duration to place the order with the supplier. This is illustrated in detail in conjunction with FIG. 6E.

The method thus provides an intuitive visual layout for replenishing inventory and ordering stock. As computing device 200 communicates with the POS device of the user, the intuitive visual layout provides a user with real time inventory levels, by way of an indication or notification regarding any stock that's running low. As a result, the user does not need to overstock or invest in latest storage technologies in order to retain its existing customer base. The method also provides a transparent way of performing transactions, as promotional offers between all parties, i.e., the user and the supplier, is shared seamlessly in electronic form. The method also enables the user and the supplier to negotiate regarding article attributes (for example, price, delivery charges, etc) through existing communication channels, for example, WhatsApp or other similar communication messengers.

Figure 5:
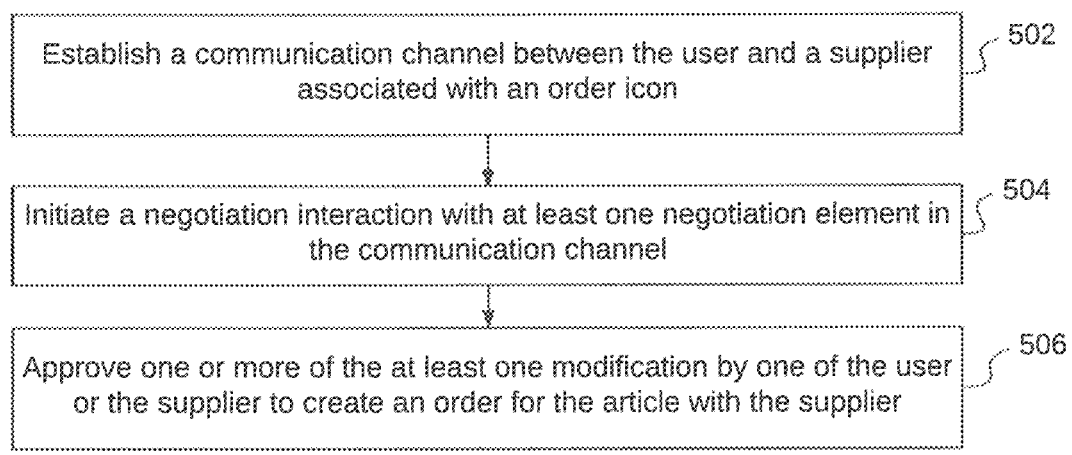
FIG. 5 illustrates a flowchart of a method for establishing a communication interface between a user and a supplier to negotiate on an order for an article, in accordance with an embodiment.

Referring now to FIG. 5, a flowchart of a method for establishing a communication interface between a user and a supplier to negotiate on an order for an article is illustrated, in accordance with an embodiment. At 502, a communication channel is established between the user and the supplier. Thereafter, at 504, a negotiation interaction is initiated by using one or more negotiation elements. At 506, one or more of the at least one modification is approved by one of the user or the supplier to create an order for the article with the supplier. This has been explained in detail in conjunction with FIG. 4.

Referring now to FIGS. 6A-6E, processing of a transaction between a user and a supplier based on user interaction on computing device 200 is illustrated, in accordance with an exemplary embodiment. When user opens an application for the claimed invention on computing device 200, a user interface 600-2 is first presented to the user. User interface 600-2 includes an article icon 602, an article icon 604, an article icon 606, and an article icon 608. Each of these article icons represent inventory level associated with a unique article. Article icon 602 may indicate, based on an icon attribute, that the inventory associated with the article represented by article icon 602 is running low. Thus, the user may want to order or replenish the article in user's inventory.

Figure 6A:
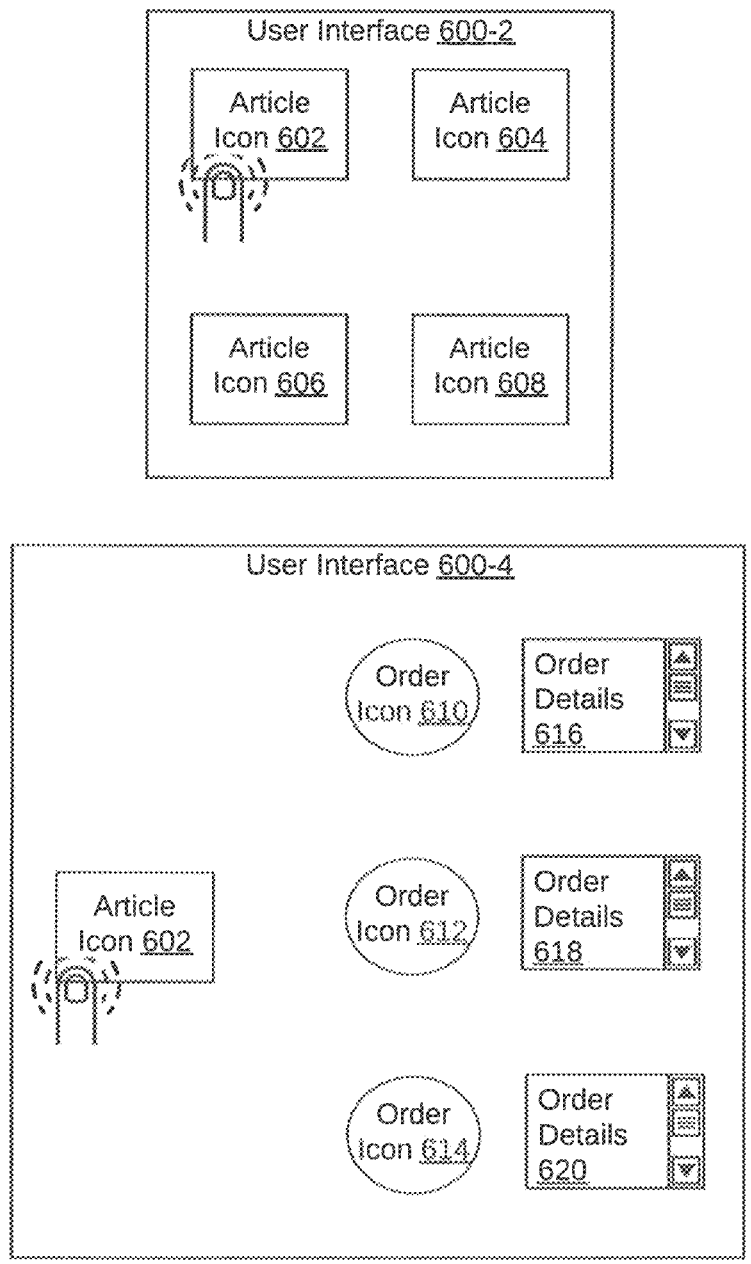
FIGS. 6A-6E illustrates processing of a transaction between a user and a supplier based on user interaction on a computing device, in accordance with an exemplary embodiment.
Figure 6B:
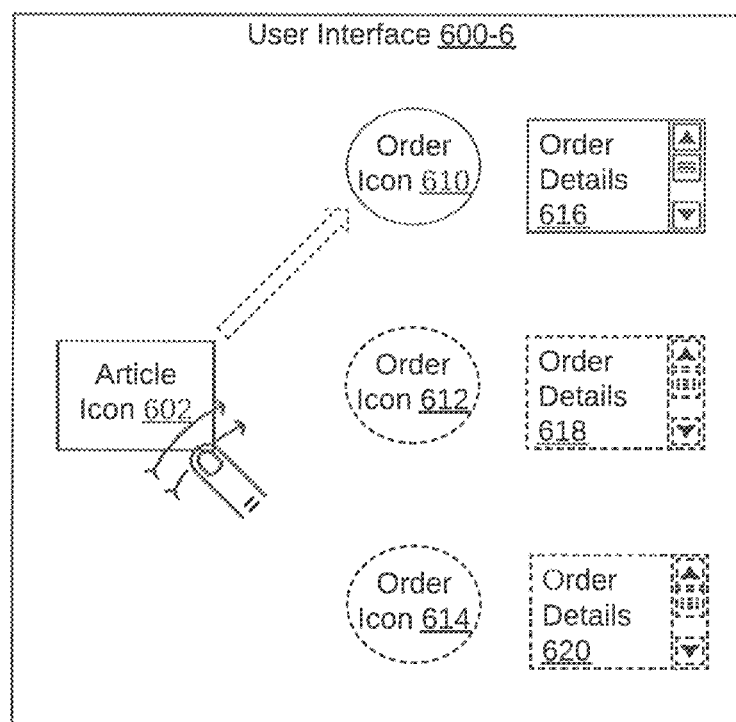
Figure 6B:
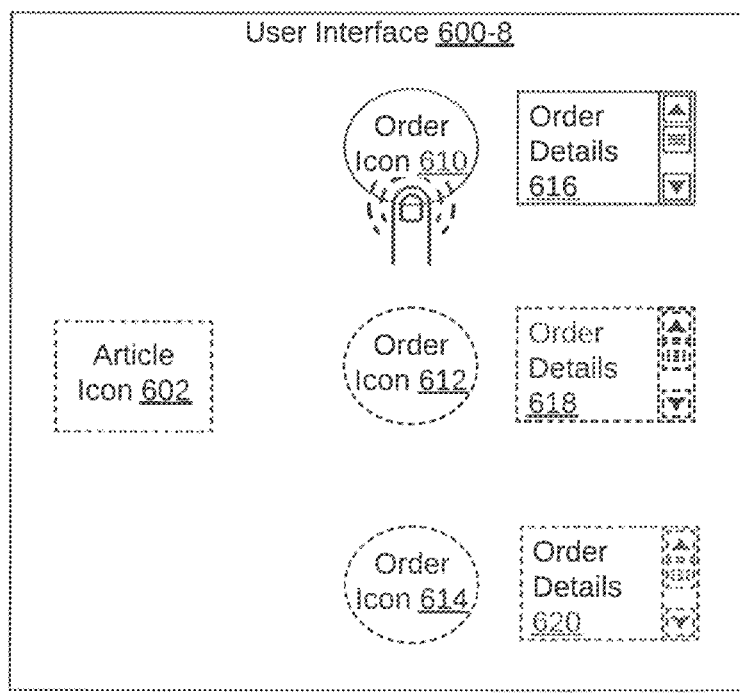
Figure 6C:
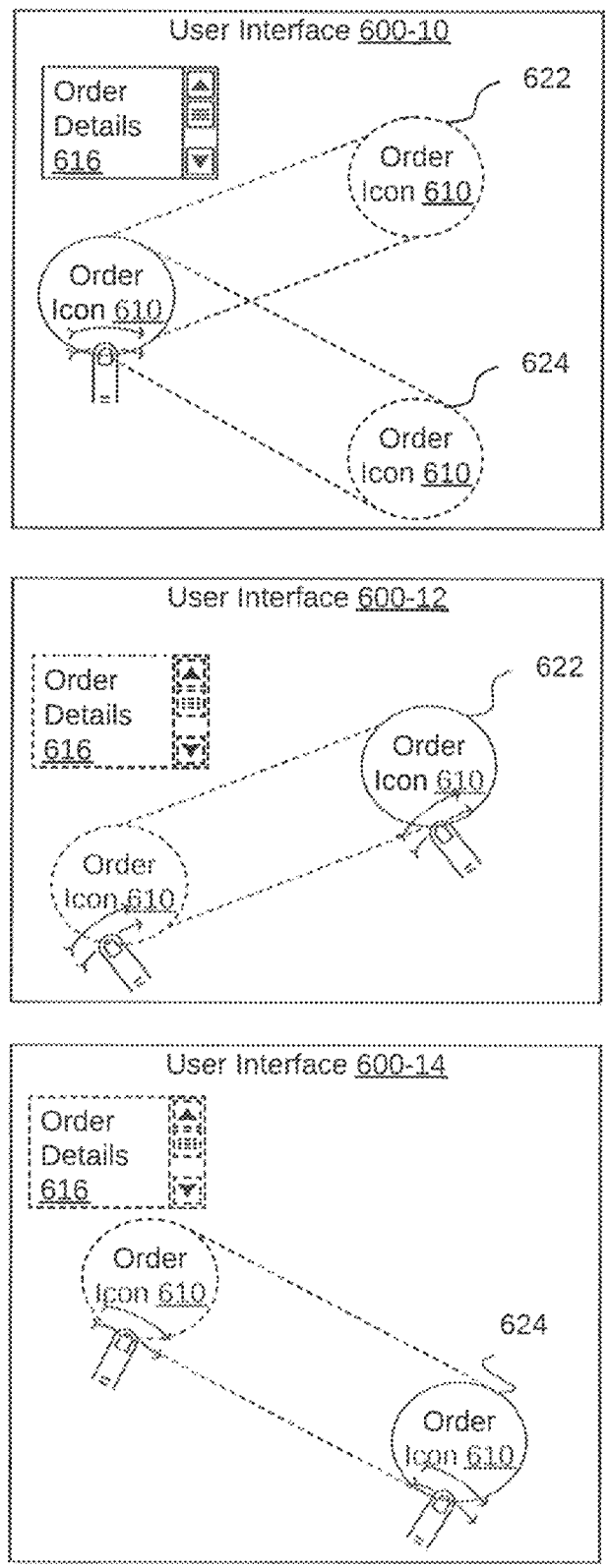

To this end, as illustrated in FIG. 6A, the user may press article icon 602 for a predefined time duration (for example, 2 seconds) and in response to this, based on business rules stored in business rules module 304, each of article icons 604, 606, and 608 disappear and an order icon 610, an order icon 612, and an order icon 614 are displayed on a user interface 600-4. Contemporaneous with display of order icons 610-614, an order detail 616 is displayed adjacent to order icon 610, an order detail 618 is displayed adjacent to order icon 612, an order detail 620 is displayed adjacent to order icon 614.

Based on a review of each of order details 616, 618, and 620, the user may decide to place an order with a supplier represented by order icon 610. To this end, as illustrated in a user interface 600-6, the user may drag and drop article icon 602 on order icon 610 in order to create an order with the supplier in conformance with order details 616. In other words, the user is in agreement with the supplier regarding article attributes mentioned in order details 616 and is ready to create the order based on these article attributes.

Alternatively, as depicted by a user interface 600-8, the user may press order icon 610 for a predefined time duration and in response to this, based on business rules stored in business rules module 304, the user's indication to select order icon 610 may be registered. Thereafter, as depicted by a user interface 600-10 in FIG. 6C, the user may have two options. The first option is to drag order Icon 610 diagonally upwards to a position 622, in response to which, based on business rules stored in business rules module 304, a user indication to confirm and place the order with the supplier is registered. A user interface 600-12 depicts the user availing this option. The second option is to drag order icon 610 in a diagonally downward direction to a position 624, in response to which, based on business rules stored in business rules module 304, a communication channel between the user and the supplier associated with order icon 610 is established. The communication channel is established to initiate negotiations between the user and the supplier. The communication channel enables the user to dynamically modify one or more article attributes related to the article for negotiation. The communication channel may be initiated on an external communication application, for example, WhatsApp. Alternatively, the communication channel may be initiated within an internal application. A user interface 600-14 depicts a user availing the second option.

Figure 6D:
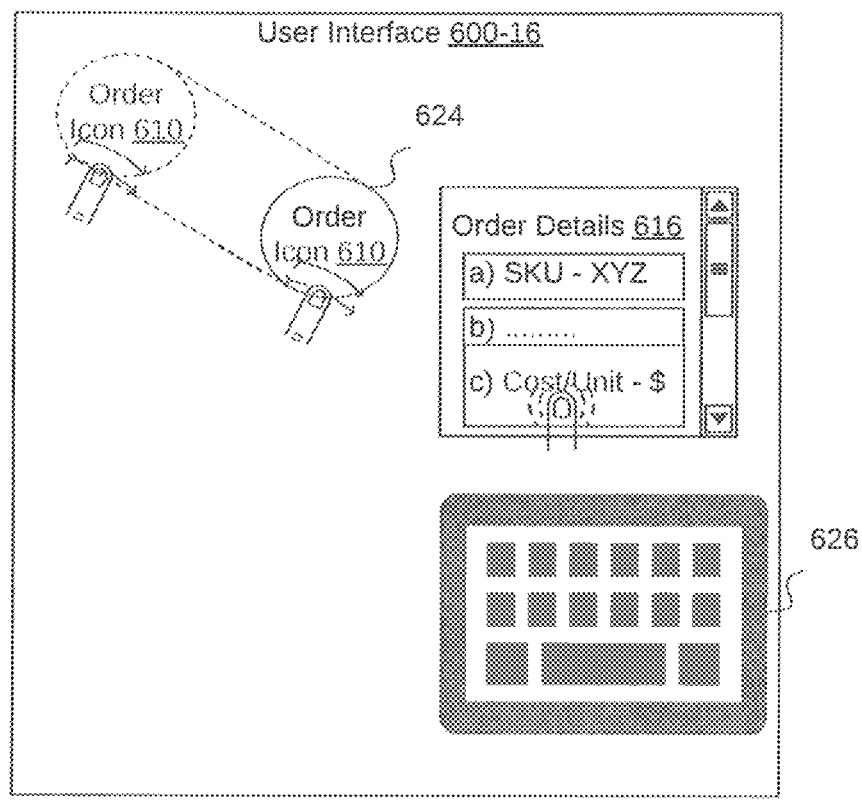
Figure 6D:
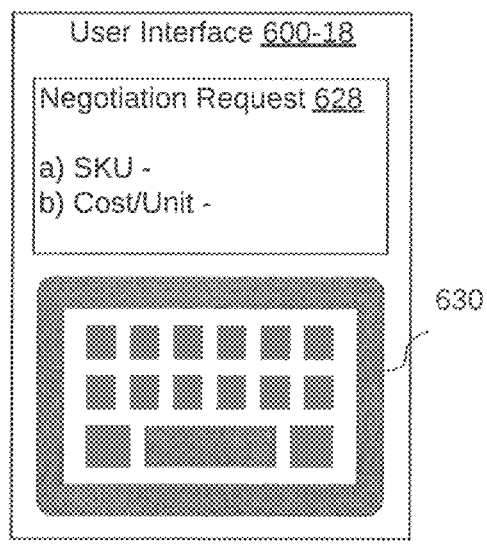

In response to user availing the second option as depicted by user Interface 600-14, a user interface 600-16, as shown in FIG. 6D, is presented to the user on computing device 200. User interface 600-16 may be presented on an external messaging application, for example, WhatsAPP, in order to conduct the negotiation process between the user and the supplier.

User interface 600-16 enables the user to interact with one or more negotiation elements associated with one or more article attributes listed in order details 616. The one or more negotiation elements might be user interface elements, for example, clickable buttons or icons. As depicted in user interface 600-16, the user presses a negotiation element associated with the article attribute of cost per unit for a predefined time duration, in response to which, based on business rules stored in business rules module 304, a user interest to modify the cost per unit quoted by the supplier is registered. Contemporaneous with user interaction with the negotiation element associated with the article attribute of cost per unit, a keypad 626 appears on user interface 600-16. The user, via keypad 626, may modify the article attribute of cost per unit or any other attribute for that matter. Once the user has modified and finalized the article attribute of cost per unit, a user interface 600-18 is presented to the supplier. User Interface 600-18 presents a negotiation request 628, which includes details of modifications made by the user in order to negotiate on one or more article attributes. The supplier may indicate to the user via the communication channel using a keypad 630, whether the supplier agrees or disagrees with modifications to the article attribute suggested by the user via negotiation request 628. Negotiations between the user and the supplier may be an iterative process, till both the user and supplier agree on each of the article attribute. In an embodiment, based on the compatibility of a computing device used by the supplier, the supplier may be provided with a user interface similar to user interface 600-16 to further facilitate the negotiation process.

Figure 6E:
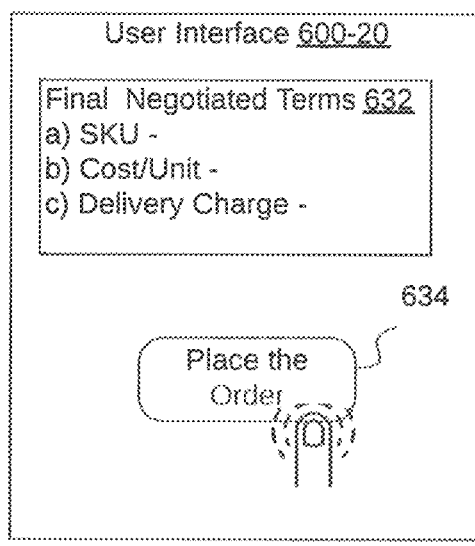

Once both the user and the supplier have reached an agreement and all the modifications made to one or more article attributes has been approved, a user interface 600-20, depicted in FIG. 6E, is presented to the user on computing device 200. User interface 600-20 includes final negotiated terms 632 which presents the user with the final value of each article attribute that has been agreed upon. Based on final negotiated terms 632, the user may intend to place an order with the supplier and may accordingly press a "place the order" button 634 for a predefined time duration. In response to the user action, based on business rules stored in business rules module 304, the order based on final negotiated terms 632 is placed with the supplier.

Figure 7:
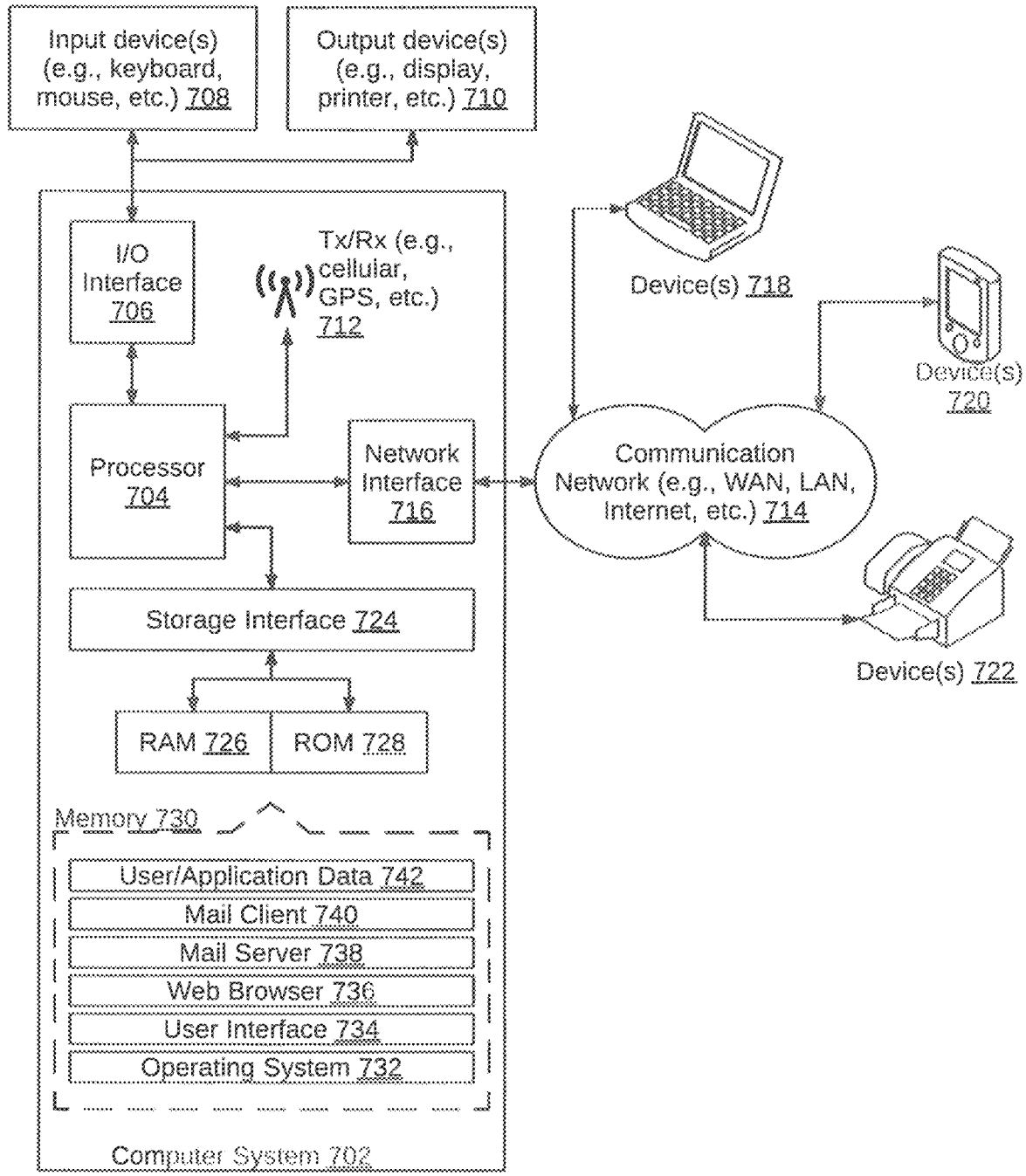
FIG. 7 illustrates a block diagram of an exemplary computer system for implementing various embodiments.

FIG. 7 illustrates a block diagram of an exemplary computer system 702 for implementing various embodiments is disclosed. Computer system 702 may comprise a central processing unit ("CPU" or "processor") 704. Processor 704 may comprise at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD Athlon, Duron or Opteron, ARM's application, embedded or secure processors, IBM PowerPC, Intel's Core, Itanium, Xeon, Celeron or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., Texas Instruments WiLink WL1283, Broadcom BCM47601UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 804 may be disposed in communication with a communication network 714 via a network interface 716. Network interface 716 may communicate with communication network 714. Network interface 716 may employ connection protocols including, without limitation, direct connect, Ethernet (e.g., twisted pair 10/100/1000 Base T), transmission control protocol/internet protocol (TCP/IP), token ring, IEEE 802.11a/b/gin/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 712, and 722. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 602 may itself embody one or more of these devices.

In some embodiments, processor 704 may be disposed in communication with one or more memory devices (e.g., a RAM 726, a ROM 728, etc.) via a storage interface 724. Storage interface 724 may connect to memory devices 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 730 may store a collection of program or database components, including, without limitation, an operating system 732, a user interface application 734, a web browser 736, a mail server 738, a mail client 740, a user/application data 742 (e.g., any data variables or data records discussed in this disclosure), etc. Operating system 732 may facilitate resource management and operation of computer system 702. Examples of operating system 732 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 702 may implement web browser 736 stored program component. Web browser 736 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 702 may implement mail server 738 stored program component. Mail server 738 may be an Internet mail server such as Microsoft Exchange, or the like. Mail server 738 may utilize facilities such as ASP, ActiveX, ANSI C++/C#, Microsoft .NET, CGI scripts, Java, JavaScript, PERL, PHP, Python, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement mail client 740 stored program component. Mail client 740 may be a mail viewing application, such as Apple Mail, Microsoft Entourage, Microsoft Outlook, Mozilla Thunderbird, etc.

In some embodiments, computer system 702 may store user/application data 742, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for processing user interaction based transactions. The device provides an intuitive visual layout for replenishing inventory and ordering stock. As the device communicates with a POS device of the user, the intuitive visual layout provides a user with real time inventory levels, by way of an indication or notification regarding any stock that's running low. As a result, the user does not need to over stock or invest in latest storage technologies in order to retain its existing customer base. The method also provides a transparent way of performing transactions, as promotional offers between all parties, i.e., the user and the supplier, is shared seamlessly in electronic form. The method also enables the user and the supplier to negotiate on various article attributes (for example, price, delivery charges, etc) through existing communication channels, for example, WhatsApp or other similar communication messengers.

The specification has described method and device for processing user interaction based transactions. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for processing a transaction based on user interaction, the method comprising:

providing, on a computing device, a plurality of article icons associated with a plurality of articles, wherein at least one icon attribute of the plurality of article icons is indicative of real-time quantity associated with the plurality of articles, wherein the at least one icon attribute of an article icon from the plurality of icons comprises at least one of a size of the article icon, a shape of the article icon, a color of the article icon, an orientation of the article icon, a position of the article icon on a display of the computing device, or a motion associated with the article icon;

receiving, by the computing device, a first user interaction with an article icon from the plurality of article icons associated with an article from the plurality of articles, wherein receiving the first user interaction with the article further comprises recognizing a unique intention associated with the first user interaction based on a plurality of user interactions mapped to one or more business rules, wherein the unique intention is of a user;

displaying, on the computing device, in response to receiving the first user interaction with the article icon, at least one order icon representing at least one supplier for the article in an order of priority and one or more order details associated with the at least one order icon;

receiving, by the computing device, a second user interaction with an order icon from the at least one order icon, wherein the user requires to modify the one or more order details associated with an order icon;

establishing, by the computing device, a communication channel between the user and a supplier associated with the order icon in response to the second user interaction with the order icon, wherein the communication channel enables at least one of the user and the supplier to initiate a negotiation interaction with one or more negotiation elements to dynamically modify at least one article attribute related to the article based on the user interactions made over the communication channel, wherein the negotiation interaction with the one or more negotiation elements in the communication channel comprises presenting the one or more negotiation elements associated with the at least one article attributes listed in the order details to the at least one of the user and the supplier over the communication channel, applying at least one modification to the at least one article attribute related to the article based on the plurality of user interactions made over the communication channel, and receiving approval for one or more of the at least on modification by one of the user or the supplier to create an order for the article with the supplier over the communication channel;

receiving a third user interaction with the order icon; and creating an order for the article with the supplier who is represented by the order icon, in response to the third user interaction with the order icon.

2. The method of claim 1, wherein the at least one article attribute comprises at least one of cost, discount, quantity, delivery charge, delivery location, delivery duration or waivers.

3. The method of claim 1, wherein each of the first user interaction, the second user interaction, and the third user interaction with the article icon displayed or the order icon displayed on a touch screen of the computing device comprises at least one of: swipe in a particular direction, icon press for a predefined duration, making a pattern on the touch screen, or dragging an icon out of the touch-screen area.

4. The method of claim 1, wherein the at least one order icon is displayed to the user based on a current location of the user with reference to a location of the at least one supplier.

5. The method of claim 1, wherein displaying the at least one order icon representing the at least one supplier comprises arranging the at least one order icon substantially around the article icon on a display of the computing device in ao the order of priority.

6. The method of claim 1, wherein displaying the at least one order icon comprises displaying at least one order detail comprising at least one article attribute related to the article, contemporaneous with display of the at least one order icon, an order detail associated with an order icon from the at least one order icon being displayed relative to the order icon.

7. The method of claim 6, wherein the at least one order detail comprises at least one of stock availability of the article with a supplier, promotional information offered by a supplier, price of the article quoted by a supplier, and time duration for delivering the article.

8. A computing device for processing a transaction based on user interaction, the computing comprising:
a processor; and
a memory communicatively coupled to the processor, wherein the memory stores processor instructions, which, on execution, causes the processor to:
provide a plurality of article icons associated with a plurality of articles, wherein at least one icon attribute of the plurality of article icons is indicative of real-time quantity associated with the plurality of articles, wherein the at least one icon attribute of an article icon from the plurality of icons comprises at least one of a size of the article icon, a shape of the article icon, a color of the article icon, an orientation of the article icon, a position of the article icon on a display of the computing device, or a motion associated with the article icon;
receive a first user interaction with an article icon from the plurality of article icons associated with an article from the plurality of articles, wherein to receive the first user interaction with the article the processor instructions further cause the processor to recognize a unique intention associated with the first user interaction based on a plurality of user interactions mapped to one or more business rules, wherein the unique intention is of a user;
display in response to receiving the first user interaction with the article icon, at least one order icon representing at least one supplier for the article in an order of priority and one or more order details associated with the at least one order icon;
receive a second user interaction with an order icon from the at least one order icon, wherein the user requires to modify the one or more order details associated with an order icon;
establish a communication channel between the user and a supplier associated with the order icon in response to the second user interaction with the order icon, wherein the communication channel enables at least one of the user and the supplier to initiate a negotiation interaction with one or more negotiation elements to dynamically modify at least one article attribute related to the article based on the user interactions made over the communication channel, wherein the negotiation interaction with the one or more negotiation elements in the communication channel further causes the processor to present the one or more negotiation elements associated with the at least one article attributes listed in the order details to the at least one of the user and the supplier over the communication channel, to apply interaction with at least one negotiation element in the communication channel, at least one modification to the at least on article attribute related to the article based on the plurality of user interactions made over the communication channel, and to receive approval for one or more of the at least on modification by one of the user or the supplier to create an order for the article with the supplier over the communication channel;
receive a third user interaction with the order icon; and
create an order for the article with the supplier who is represented by the order icon, in response to the third user interaction with the order icon.

9. The computing device of claim 8, wherein each of the first user interaction, the second user interaction, and the third user interaction with the article icon displayed or the order icon displayed on a touch screen of the computing device comprises at least one of: swipe in a particular direction, icon press for a predefined duration, making a pattern on the touch screen, or dragging an icon out of the touch-screen area.

10. The computing device of claim 8, wherein the at least one order icon is displayed to the user based on a current location of the user with reference to a location of the at least one supplier.

11. The computing device of claim 8, wherein to display the at least one order icon representing the at least one supplier, the processor instructions further cause the processor to arrange the at least one order icon substantially around the article icon on a display of the computing device in the order of priority.

12. The computing device of claim 8, wherein the processor instructions further cause the processor to display at least one order detail comprising at least one article attribute related to the article, contemporaneous with display of the at least one order icon, an order detail associated with an order icon from the at least one order icon being displayed relative to the order icon.

13. The computing device of claim 12, wherein the at least one order detail comprises at least one of stock availability of the article with a supplier, promotional information offered by a supplier, price of the article quoted by a supplier, and time duration for delivering the article.

14. A non-transitory computer-readable storage medium having stored thereon, a set of computer-executable instructions causing a computer comprising one or more processors to perform steps comprising:
providing a plurality of article icons associated with a plurality of articles, wherein at least one icon attribute of the plurality of article icons is indicative of real-time quantity associated with the plurality of articles, wherein the at least one icon attribute of an article icon from the plurality of icons comprises at least one of a size of the article icon, a shape of the article icon, a color of the article icon, an orientation of the article icon, a position of the article icon on a display of the computing device, or a motion associated with the article icon;
receiving a first user interaction with an article icon from the plurality of article icons associated with an article from the plurality of articles, wherein receiving the first user interaction with the article further comprises recognizing a unique intention associated with the first user interaction based on a plurality of user interactions mapped to one or more business rules, wherein the unique intention is of a user;
displaying in response to receiving the first user interaction with the article icon, at least one order icon representing at least one supplier for the article in an order of priority and one or more order details associated with the at least order icon;

receiving a second user interaction with an order icon from the at least one order icon, wherein the user requires to modify the one or more order details associated with an order icon;

establishing a communication channel between the user and a supplier associated with the order icon in response to the second user interaction with the order icon, wherein the communication channel enables at least one of the user and the supplier to initiate a negotiation interaction with one or more negotiation elements to dynamically modify the at least one article attribute related to the article based on the user interactions made over the communication channel, wherein the negotiation interaction with at least the one or more negotiation elements in the communication channel comprises presenting one or more negotiation elements associated with at least one article attributes listed in the order details to the at least one of the user and the supplier over the communication channel, applying at least one modification to at least one article attribute related to the article based on the plurality of user interactions made over the communication channel, and receiving approval for one or more of the at least on modification by one of the user or the supplier to create an order for the article with the supplier over the communication channel;

receiving a third user interaction with the order icon; and creating an order for the article with the supplier who is represented by the order icon, in response to the third user interaction with the order icon.

* * * * *